(12) United States Patent
Zayas et al.

(10) Patent No.: US 7,117,303 B1
(45) Date of Patent: Oct. 3, 2006

(54) EFFICIENT, ROBUST FILE HANDLE INVALIDATION

(75) Inventors: Edward R. Zayas, Milpitas, CA (US); Raymond C. Chen, Campbell, CA (US); Blake H. Lewis, Los Altos Hills, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 299 days.

(21) Appl. No.: 10/389,451

(22) Filed: Mar. 14, 2003

(51) Int. Cl.
*G06F 12/00* (2006.01)

(52) U.S. Cl. ..................................... 711/112; 711/114

(58) Field of Classification Search ........ 707/203–205, 707/10; 711/111–114, 217, 220
See application file for complete search history.

(56) References Cited

U.S. PATENT DOCUMENTS

| | | | |
|---|---|---|---|
| 5,737,523 A * | 4/1998 | Callaghan et al. ........... | 713/201 |
| 5,742,817 A * | 4/1998 | Pinkoski ..................... | 707/200 |
| 5,819,292 A | 10/1998 | Hitz et al. | |
| 5,963,962 A | 10/1999 | Hitz et al. | |
| 6,038,570 A | 3/2000 | Hitz et al. | |
| 6,775,672 B1 * | 8/2004 | Mahalingam et al. ......... | 707/10 |
| 6,775,673 B1 * | 8/2004 | Mahalingam et al. ......... | 707/10 |

OTHER PUBLICATIONS

U.S. Appl. No. 09/898,894, filed Jul. 3, 2001, Steven S. Watanabe et al.
U.S. Appl. No. 09/933,866, filed Aug. 20, 2001, Samuel M. Cramer.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.

* cited by examiner

*Primary Examiner*—T Nguyen
(74) *Attorney, Agent, or Firm*—Cesari and McKenna, LLP (57) ABSTRACT

The present invention provides a technique for efficiently generating and validating external file handles at a storage operating system of a filer. According to one aspect of the technique, the storage operating system associates a unique internal file handle with each file or directory stored in the filer. This unique internal file handle is used to generate a corresponding external file handle. Unlike previous approaches, the internal file handles' representations do not change depending on the location of their corresponding files or directories, e.g., on-disk or in-core, within the filer, thereby simplifying file management within the filer. According to another aspect of the inventive technique, the filer executes a file-handle validation procedure to determine whether an external file handle received with a file access request has become invalid (or "stale") as a result of an NVRAM failure in the filer. The file-handle validation procedure enables the filer to efficiently determine the validity of the external file handle without having to perform conventional time-consuming and processing-intensive operations. Advantageously, the inventive technique is preferably only applied to generation and validation of external file handles configured in accordance with a stateless file-system protocol, such as the NFS protocol. In this way, there is no overhead added to the filer's storage operating system for generating and validating external file handles configured in accordance with stateful file-system protocols.

35 Claims, 7 Drawing Sheets

VID=

| SERIAL NUMBER (VSN) 510 | VOLUME NUMBER (V=0-255) 520 |

| V=0 | V=1 | ... | V=255 |
|---|---|---|---|
| VSN=0x76B2  630 | VSN=0x23FF  630 | ... | 0 |
| NVFAIL COUNT = 1  640 | NVFAIL COUNT = 2  640 | ... | 0 |
| VSN=0x0A10  630 | 0 | ... | 0 |
| NVFAIL COUNT = 1  640 | | | |

EFFICIENT, ROBUST FILE HANDLE INVALIDATION

FIELD OF THE INVENTION

The present invention relates to storage systems and, more specifically, to a technique for generating and validating file handles used to access files stored on a storage system.

BACKGROUND OF THE INVENTION

A file server is a computer that provides file service relating to the organization of information on storage devices, such as disks. The file server or filer may be embodied as a storage system including a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored.

As used herein, the term storage operating system generally refers to the computer-executable code operable on a storage system that manages data access and client access requests and may implement file system semantics in implementations involving filers. In this sense, the Data ONTAP™ storage operating system, available from Network Appliance, Inc. of Sunnyvale, Calif., which implements a Write Anywhere File Layout (WAFL™) file system, is an example of such a storage operating system implemented as a microkernel within an overall protocol stack and associated disk storage. The storage operating system can also be implemented as an application program operating over a general-purpose operating system, such as UNIX® or Windows NT®, or as a general-purpose operating system with configurable functionality, which is configured for storage applications as described herein.

A filer's disk storage is typically implemented as one or more storage volumes that comprise physical storage disks, defining an overall logical arrangement of storage space. Currently available filer implementations can serve a large number of discrete volumes (150 or more, for example). A storage volume is "loaded" in the filer by copying the logical organization of the volume's files, data and directories into the filer's memory. Once a volume has been loaded in memory, the volume may be "mounted" by one or more users, applications, devices, etc. permitted to access its contents and navigate its namespace. As used herein, a volume is said to be "in use" when it is loaded in a filer's memory and at least one user, application, etc. has mounted the volume and modified its contents.

Each file and directory stored in a filer is typically identified by a file-handle identifier or "file handle." A file handle generally includes at least a volume identifier (V), a file identifier (F) and a generation number (G) that collectively describe a specific file or directory in the filer. The volume identifier indicates which storage volume in the filer contains the file or directory. The file identifier identifies the specific file or directory in the volume. For example, if the volume implements an inode-based file system, such as the WAFL™ file system, the file identifier may correspond to an inode number of a file or directory within the volume. The generation number identifies a particular instance of the file or directory in the volume. For instance, if different versions of the same file are stored in the volume, each may be differentiated from the others by its corresponding generation number. In general, the largest generation number for a file or directory corresponds to its most recent version. Of note, file handles may include other information besides a volume identifier, file identifier and generation number. Thus, those skilled in the art will appreciate that a variety of different file-handle implementations are envisioned within the scope of the present invention.

However, for purposes of discussion hereinafter, it will be assumed that file handles are represented as a simple concatenation of a volume identifier, file identifier and generation number, i.e., file handle (FH)=[V][F][G]. For example, a file handle equal to [V=12][F=17][G=6] corresponds to the sixth generation of a file or directory which is assigned a file identifier (or inode number) equal to 17 and is stored in the storage volume whose volume number equals 12. Again, while the notation above will be used for purposes of explanation, those skilled in the art will appreciate that many other file handle formats may be implemented in accordance with the present invention.

A filer may be configured to operate according to a client/server model of information delivery to thereby allow many clients to access files stored on a server, e.g., the filer. In this model, the client may comprise an application, such as a file-system protocol, executing on a computer that "connects" to the filer over a computer network, such as a point-to-point link, shared local area network (LAN), wide area network (WAN), or virtual private network (VPN) implemented over a public network such as the Internet. Communications between the filer and its clients are typically embodied as packets sent over the computer network. Each client may request the services of the filer by issuing file-system protocol messages formatted in accordance with a conventional file-system protocol, such as the Common Internet File System (CIFS) or Network File System (NFS) protocol.

In general, clients are configured to communicate with a file-access protocol engine of the filer using a stateful or stateless file-system protocol. A stateful protocol, such as the CIFS protocol, is a connection-oriented protocol that requires the filer, e.g., the file-access protocol engine, and the client to establish a communication session (or "virtual circuit") through which they exchange information. Each communication session is then associated with session-specific "state" information, which may include, inter alia, authentication information, session identifiers, file-handle identifiers, and so forth. In the event the session is lost or interrupted, its state information may be used to reestablish the session without having to re-authenticate the client or renegotiate many of the session parameters. Upon re-establishing the stateful-protocol session, the filer typically invalidates the client's outstanding file handles and issues a new set of file handles to the client. Thus, any client requests that were lost as a result of the session failure can be "replayed" by the client using the new set of file handles.

In contrast, a stateless protocol, such as the NFS protocol, does not require establishment of a formal communication session. Instead, each client request in a stateless protocol is authenticated and processed by the filer on a per-request basis rather than a per-session basis. That is, the validity of a client request in a stateless protocol is not bound to the duration of any specific communication session. Thus, unlike file handles used in stateful protocols, file handles in stateless protocols may remain valid even after the filer has been temporarily shutdown or disabled.

A non-volatile random access memory (NVRAM) is often employed in a filer's architecture as a backup memory that ensures the filer does not "lose" received client information, e.g., CIFS and NFS requests, in the event of a system shutdown or other unforeseen problem. The NVRAM is typically a large-volume solid-state memory array (RAM) having either a back-up battery, or other built-in last-state-retention capabilities (e.g. a FLASH memory), that holds the last state of the memory in the event of any power loss to the array. Therefore, even if a client request stored in the filer's "in-core" memory is lost or erased, e.g., due to a temporary power outage, it still may be recovered from the filer's NVRAM.

However, data recovery problems can arise when the contents of the filer's "in-core" memory is lost or corrupted and, in addition, the filer's backup NVRAM fails. As used herein, an NVRAM "fails" when it is unable to function in its normal capacity for storing and retaining information. Such a failure may be due to electrical or mechanical problems within the NVRAM, loss of power supplied to the NVRAM, failure of a memory controller coupled to the NVRAM, etc. After an NVRAM failure, the NVRAM's lost data may be not be recoverable in the filer if the data was also erased, overwritten or corrupted in the filer's in-core memory, e.g., due to a reboot operation involving the filer. In such a situation, the filer can only recover the lost data by re-retrieving the data from its original source or a suitable substitute.

For example, suppose an unprocessed client request is held in the NVRAM when it fails. Further suppose the request is not resident in the filer's in-core memory after the NVRAM fails and the filer's operation is restored. If the request was issued in accordance with a stateful protocol, such as the CIFS protocol, the requesting client may reestablish its communication session with the filer and replay the lost request using a newly issued file handle. However, if the client's request was issued according to a stateless protocol, such as the NFS protocol, the requesting client may not be notified of the NVRAM failure. Worse yet, the "stateless" client may continue to send the filer requests for files and directories that were lost or damaged by the NVRAM's failure. For this reason, the filer may be configured to identify when a received client request has become invalid as a result of an NVRAM failure.

A previous approach for detecting invalid client requests utilizes "internal" and "external" file handle representations for each file and directory stored in the filer. As defined herein, an external file handle is a file handle by which a client identifies a file or directory stored in the filer. In contrast, an internal file handle is a file handle used within the filer's storage operating system (and, in particular, the file system) to identify a file or directory stored in the filer. Prior filer implementations have employed two different types of internal file handles: "on-disk" and in-core file handles. An on-disk file handle uniquely identifies a file or directory stored on one of the filer's storage mediums, such as a storage disk. An in-core file handle uniquely identifies a file or directory stored in the filer's volatile (in-core) memory. Notably, a file's on-disk, in-core and external file handles need not be identical, and, in fact, are different in many cases.

In prior filer implementations, on-disk and in-core file handles for the same file or directory may differ only in the value of their generation numbers. That is, the generation number of a file's in-core file handle may be greater than the generation number of its on-disk file handle by an amount equal to an NVRAM-failure ("nvfail") count value. Each volume in the filer is associated with a respective nvfail count value that stores the number of times the filer's NVRAM failed while the volume was in use. Typically, each volume's nvfail count value is cumulative and persistent for the "life" of the volume. For example, the first generation of a file identifier 17 located in volume 12 has an on-disk file handle equal to [V=12][F=17][G=1]. If the volume 12 has an associated nvfail count equal to 2, then when the file is copied into the filer's in-core memory, the file system assigns the file an in-core file handle equal to [V=12][F=17][G=3]. In operation, the in-core file handles for files and directories are exported to clients that request access to those files and directories. Accordingly, a file's external file handle typically coincides with its in-core file-handle representation.

In response to receiving a client file access request, the filer determines the validity of the external file handle associated with the request to ensure that the file handle has not become invalid ("stale") as a result of an NVRAM failure in the filer. To that end, the file system decrements the received file handle's generation number by the current nvfail count value associated with the volume containing the file handle's referenced file or directory. The resultant generation number is then compared with the generation number contained in the requested file or directory's on-disk file handle. If the two generation numbers are equal, the file system concludes the external file handle is valid.

For example, suppose the external file handle [V=12][F=17][G=3] is received at the filer to reference a file abc. Also, assume the referenced file abc has an on-disk internal file handle equal to [V=12][F=17][G=1]. Notably, the volume 12's nvfail count value equaled two when the external file handle was generated. Next, further assume the filer's NVRAM failed some time after the external file handle was issued, and the volume 12's nvfail count has been incremented to currently equal three. In this case, the file system can test the validity of the external file handle by subtracting volume 12's current nvfail count value (3) from the external file handle's generation number (G=3) and comparing the resultant generation number (G=0) to the generation number of the file abc's on-disk file handle (G=1). Since the comparison indicates the generation numbers are not equal (0≠1), the file system concludes the external file handle it received is invalid.

Although the above-mentioned technique is effective for identifying invalid file handles received at the filer, it adds complexity to file management within the filer. Specifically, every time a file (or directory) is transferred between the filer's storage disks and memory, the file's generation number must be adjusted by the nvfail count value of its containing volume. The computation required to convert between in-core and on-disk generation numbers may consume a substantial amount of time and processing resources in the filer. This is especially true when the file system manipulates a large number of files and directories, e.g., in a database system, that are repeatedly updated and modified. Furthermore, the generation number adjustments often result in the file system adding and subtracting a value of zero, since filer volumes often have nvfail count values equal to zero. In this case, the on-disk and in-core file handles are equal, so the adjustment operation performed within the file system is essentially unnecessary. In addition, the process of converting between on-disk and in-core generation numbers permeates all file-management software in the filer's code base (including the file system), thereby increasing the possibility of hard-to-detect errors due to improper conversions.

As noted, prior filer implementations require a filer to verify every external file handle it receives by modifying the generation number of the received file handle and comparing the resultant generation number to an "expected" generation number. This file-handle validation procedure is applied regardless of whether the external file handle is formatted according to a stateful or stateless file-system protocol. Thus, the filer may unnecessarily consume time and processing resources testing the validity of external file handles used in a stateful protocol, such as the CIFS protocol. Further, when a large number of external file handles are received at the filer, the process of validating the large number of file handles may consume excessive time and filer resources.

It is therefore desirable to reduce the amount of time and processing resources, such as central processor unit (CPU) bandwidth and memory usage, consumed by a filer that generates and validates external file handles that may become invalid after an NVRAM failure in the filer. It is also desirable to simplify the manner in which the filer identifies files and directories stored in its storage disks and in its in-core memory.

SUMMARY OF THE INVENTION

The present invention provides a technique for efficiently generating and validating external file handles at a storage operating system of a filer. According to one aspect of the technique, the storage operating system associates a unique internal file handle with each file or directory stored in the filer. This unique internal file handle is used to generate a corresponding external file handle. Unlike previous approaches, the internal file handles' representations do not change depending on the location of their corresponding files or directories, e.g., on-disk or in-core, within the filer, thereby simplifying file management within the filer. According to another aspect of the inventive technique, the filer executes a file-handle validation procedure to determine whether an external file handle received with a file access request has become invalid (or "stale") as a result of an NVRAM failure in the filer. The file-handle validation procedure enables the filer to efficiently determine the validity of the external file handle without having to perform conventional time-consuming and processing-intensive operations.

In the illustrative embodiment, the in-core file handle of a file or directory served by a file system of the storage operating system is the same as its on-disk file handle representation (i.e., the "unique" internal file handle). The external file handle is generated by modifying the unique internal file handle with NVRAM-failure ("nvfail") information. Modification of the unique internal file handle is effected by adjusting its generation number based on the value of an "nvfail count value" associated with the volume in which the file or directory is stored. Notably, this adjustment is made "outside" the file system and is essentially "offloaded" onto a file-access protocol engine of the storage operating system, thereby obviating the conversion process previously performed by the file system when transferring files and directories between disk and memory. Preferably, only file-access protocol engines configured in accordance with stateless protocols, such as the NFS protocol, generate external file handles by modifying unique internal file handles in the filer. Therefore, external file handles generated by stateful file-access protocol engines are preferably the same as their corresponding unique internal file-handle representations.

The file-handle validation procedure comprises one or more "validity tests" that the filer can perform quickly and with relatively little processing. For example, one test checks whether the file handle is formatted according to a stateful or stateless file-system protocol. Because stateful protocols, such as the CIFS protocol, typically implement their own file-handle invalidation schemes, the filer may determine that a received external file handle is valid if it is formatted according to a stateful protocol. Another validity test checks whether all of the filer's currently loaded volumes have an nvfail count value equal to zero. If so, the filer can conclude that none of its loaded volumes were in use during an NVRAM failure, and consequently their outstanding external file handles are valid. Yet another test determines the validity of an external file handle based on the nvfail count value associated with the individual volume containing the file handle's referenced file or directory. Accordingly, the filer can determine the external file handle is valid if the volume's nvfail count value equals zero.

Advantageously, the inventive technique enables a filer to generate an external file handle using only a single internal file handle associated with each file or directory stored in the filer. In this manner, the technique reduces the amount of coding overhead and filer processing previously required to implement on-disk and in-core internal file handles. Furthermore, external file handles generated by the technique are "backwards compatible" with previous implementations. As such, upgrade or revert of a filer's version may be performed transparently to its clients. In addition, the technique minimizes the amount of time and processing the filer consumes when determining the validity of external file handles. As such, the filer can perform its file-handle invalidation operations in a faster, more efficient manner than in prior implementations.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Storage System Environment

Figure 1:
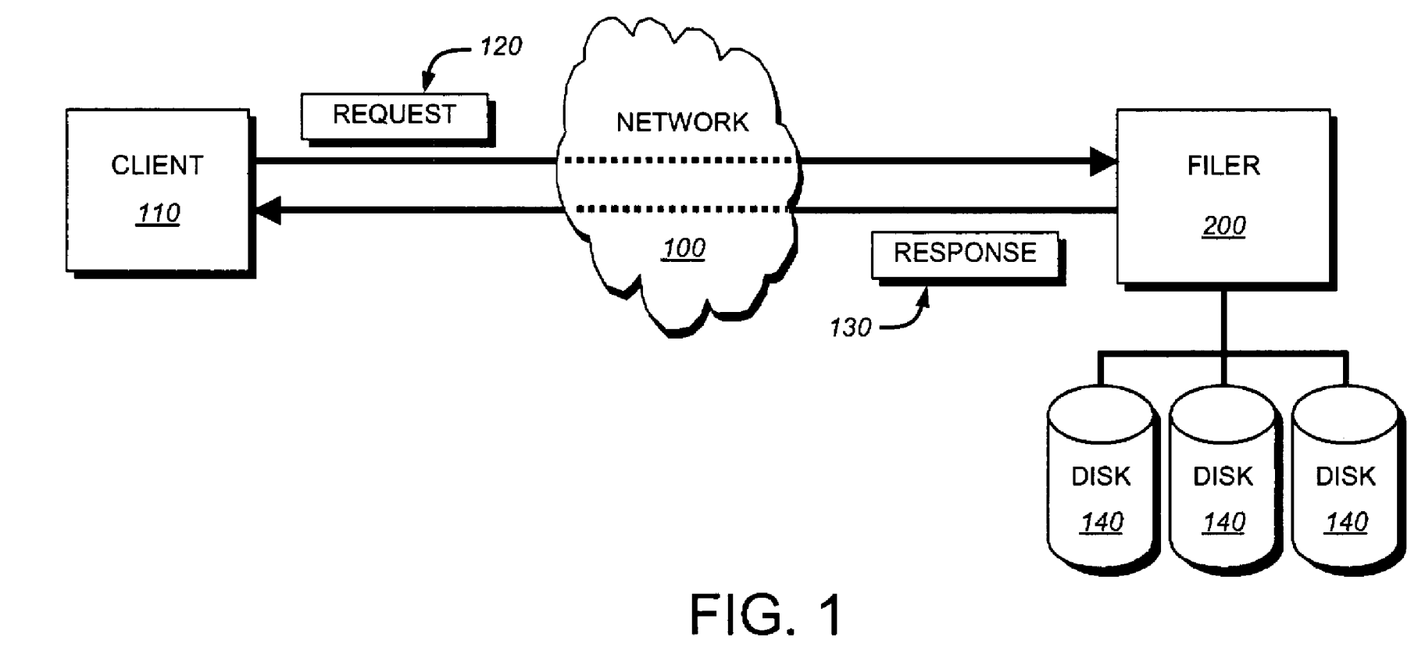
FIG. 1 is a schematic block diagram of an exemplary storage system environment that may be used in accordance with the present invention.

FIG. 1 is a schematic block diagram of a storage system environment that includes a network 100 through which a client 110 may communicate with a server, e.g., a file server 200. The network may comprise one or more point-to-point links, shared local area networks (LAN), wide area networks (WAN), and the like. The filer server or "filer" 200 is a computer that provides file service relating to the organization of information on storage devices, such as storage disks 140. In operation, the client may send the filer a request 120 to access a specific file or directory, e.g., stored in the disks 140. The request may be "packetized" and formatted according to predetermined communication protocols, such as the Transport Control Protocol (TCP) and Internet Protocol (IP). The filer processes the client request and, when appropriate, transmits a response 130 to the client over the network 100.

Figure 2:
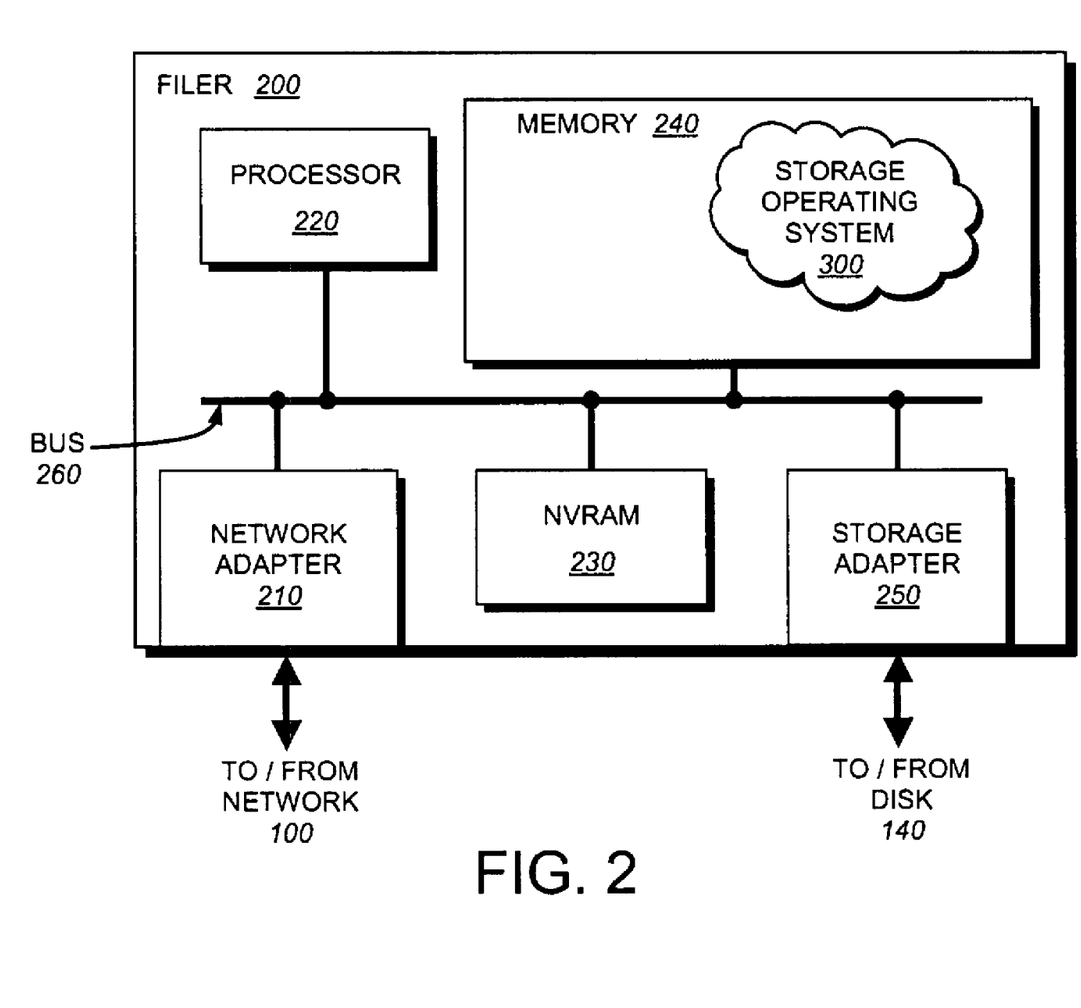
FIG. 2 is a schematic block diagram of an illustrative filer that may be employed in the storage system environment of FIG. 1.

FIG. 2 is a schematic block diagram of the filer 200 that may be advantageously used with the present invention. The filer 200 comprises a network adapter 210, processor 220, an NVRAM 230, a memory 240, and a storage adapter 250 interconnected by a system bus 260. Those skilled in the art will understand that the inventive technique described herein may apply to any type of special-purpose computer (e.g., file serving appliance) or general-purpose computer, including a standalone computer, embodied as a storage system. To that end, filer 200 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

The network adapter 210 comprises the mechanical, electrical and signaling circuitry needed to connect the filer 200 to a client 110 over a computer network 100, which may comprise a point-to-point connection or a shared medium, such as a local area network. The client 110 may be a general-purpose computer configured to execute applications, such as a file-system protocol. Moreover, the client 110 may interact with the filer 200 in accordance with a client/server model of information delivery. That is, the client may forward requests 120 for the services of the filer, and the filer may return the results 130 of the services requested by the client, by exchanging packets encapsulating, e.g., the Common Internet File System (CIFS) protocol or Network File System (NFS) protocol format over the network 100.

The NVRAM 230 provides fault-tolerant backup of data, enabling the integrity of filer transactions to survive a service interruption based upon a power failure, or other fault. The size of the NVRAM is variable, although it is typically sized sufficiently to log a certain time-based chunk of transactions (for example, several seconds worth). The NVRAM may store client requests corresponding to discrete client messages requesting file transactions such as "WRITE," "CREATE," "OPEN," and the like. Further, these entries may be logged in the NVRAM, e.g., according to the particular order they are completed. The use of the NVRAM for system backup and crash recovery operations is generally described in commonly assigned application Ser. No. 09/898,894, entitled System and Method for Parallelized Replay of an NVRAM Log in a Storage Appliance by Steven S. Watanabe et al. which is expressly incorporated herein by reference.

In the illustrative embodiment, the memory 240 comprises storage locations that are addressable by the processor and adapters for storing software program code and data. The memory comprises a form of random access memory (RAM) that is generally cleared by a power cycle or other reboot operation (e.g., it is a "volatile" memory). The processor 220 and adapters may, in turn, comprise processing elements and/or logic circuitry configured to execute the software code and manipulate the data stored in the memory 240. The storage operating system 300, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The storage adapter 250 cooperates with the operating system 300 executing on the filer to access information requested by the client. The information may be stored on the disks 140 that are attached, via the storage adapter 250, to the filer 200 or other node of a storage system as defined herein. The storage adapter 250 includes input/output (I/O) interface circuitry that couples to the disks 140 over an I/O interconnect arrangement, such as a conventional high-performance, Fibre Channel serial link topology. The information is retrieved by the storage adapter and, if necessary, processed by the processor 220 (or the adapter 250 itself) prior to being forwarded over the system bus 260 to the network adapter 210, where the information is formatted into a packet and returned to the client 110.

In an illustrative embodiment, the disks 140 are arranged into a plurality of volumes, each having a file system associated therewith. The volumes each include one or more disks. In one embodiment, the physical disks 140 are configured into RAID groups so that some disks store striped data and at least one disk stores separate parity for the data, in accordance with a preferred RAID 4 configuration. However, other configurations (e.g. RAID 5 having distributed parity across stripes) are also contemplated. In a typical implementation, a volume is embodied as a multiplicity of RAID groups.

B. Storage Operating System

Again to summarize, the term "storage operating system" as used herein with respect to a filer generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 3:
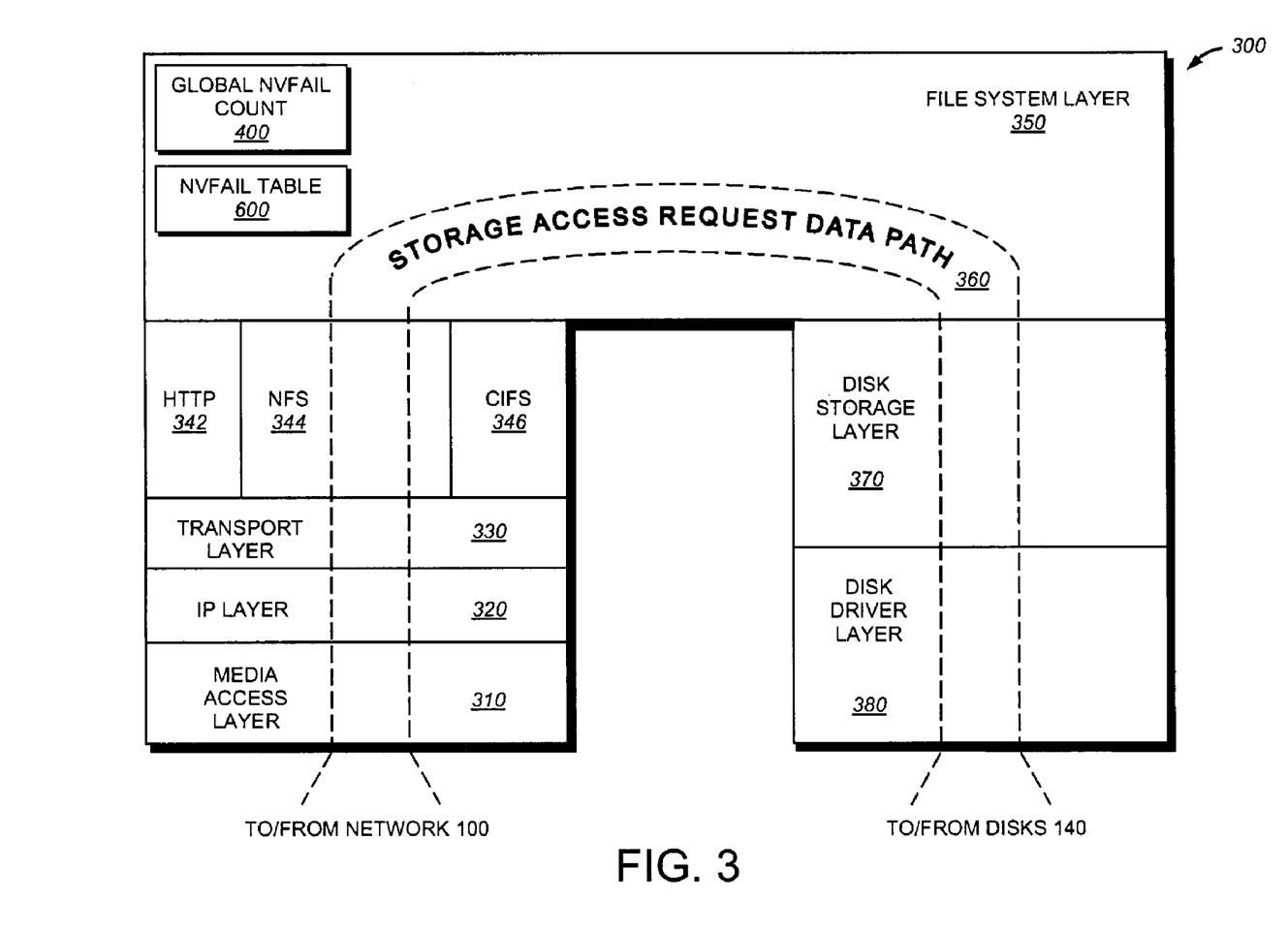
FIG. 3 is a schematic block diagram of an exemplary storage operating system that may be implemented by the filer in FIG. 2.

The organization of a storage operating system for the exemplary filer is now described briefly. However, it is expressly contemplated that the principles of this invention can be implemented using a variety of alternate storage operating system architectures. As shown in FIG. 3, the storage operating system 300 comprises a series of software layers organized to form an integrated network protocol stack that provides data paths for clients to access information stored on the filer using file-access protocols. The protocol stack includes a media access layer 310 of network drivers (e.g., an Ethernet driver) that interfaces to network communication and protocol layers, such as the Internet Protocol (IP) layer 320 and the transport layer 330 (e.g., TCP/UDP protocol). A file-access protocol layer provides multi-protocol data access and, to that end, includes support for the Hypertext Transfer Protocol (HTTP) protocol 342, the NFS protocol 344 and the CIFS protocol 346. In addition, the storage operating system 300 may include support for other protocols, including, but not limited to, the direct access file system (DAFS) protocol, the web-based distributed authoring and versioning (WebDAV) protocol, the Internet small computer system interface (iSCSI) protocol, and so forth. The storage operating system 300 also includes a disk storage layer 370 that implements a disk storage protocol, such as a RAID protocol and a disk driver layer 380 that implements a disk control protocol, such as the small computer system interface (SCSI).

Bridging the disk software layers with the network and file-system protocol layers is a file system layer 350 of the storage operating system 300. In an illustrative embodiment, the layer 350 implements a file system having an on-disk format representation that is block-based using, e.g., 4-kilobyte (KB) data blocks and using inodes to describe the files. An inode is a data structure used to store information about a file, such as ownership of the file, access permission for the file, size of the file, name of the file, location of the file, etc. In response to receiving a client's file access request 120, the file system generates operations to load (retrieve) the requested data from disks 140 if it is not resident in the filer's "in-core" memory 240. An external file handle in the client request typically identifies a file or directory requested by the client 110. Specifically, the file handle may specify a generation number, inode number and volume number corresponding to the client's requested data.

If the information is not resident in the filer's "in-core" memory 240, the file system layer 350 indexes into an inode file using the received inode number to access an appropriate entry and retrieve a logical volume block number. The file system layer 350 then passes the logical volume block number to the disk storage (RAID) layer 370, which maps that logical number to a disk block number and sends the latter to an appropriate driver (for example, an encapsulation of SCSI implemented on a fibre channel disk interconnection) of the disk driver layer 380. The disk driver accesses the disk block number from disks 140 and loads the requested data in memory 240 for processing by the filer 200. Upon completion of the request, the filer (and storage operating system) returns a response 130, e.g., a conventional acknowledgement packet defined by the CIFS specification, to the client 110 over the network 100.

It should be noted that the software "path" 360 through the storage operating system layers described above needed to perform data storage access for the client request received at the filer may alternatively be implemented in hardware or a combination of hardware and software. That is, in an alternate embodiment of the invention, the storage access request path 360 may be implemented as logic circuitry embodied within a field programmable gate array (FPGA) or an application specific integrated circuit (ASIC). This type of hardware implementation increases the performance of the file service provided by filer 200 in response to a file system request packet 120 issued by client 110. Moreover, in another alternate embodiment of the invention, the processing elements of network and storage adapters 210 and 250 may be configured to offload some or all of the packet processing and storage access operations, respectively, from processor 220 to thereby increase the performance of the file service provided by the filer.

C. Accounting for NVRAM Failures

Figure 4:
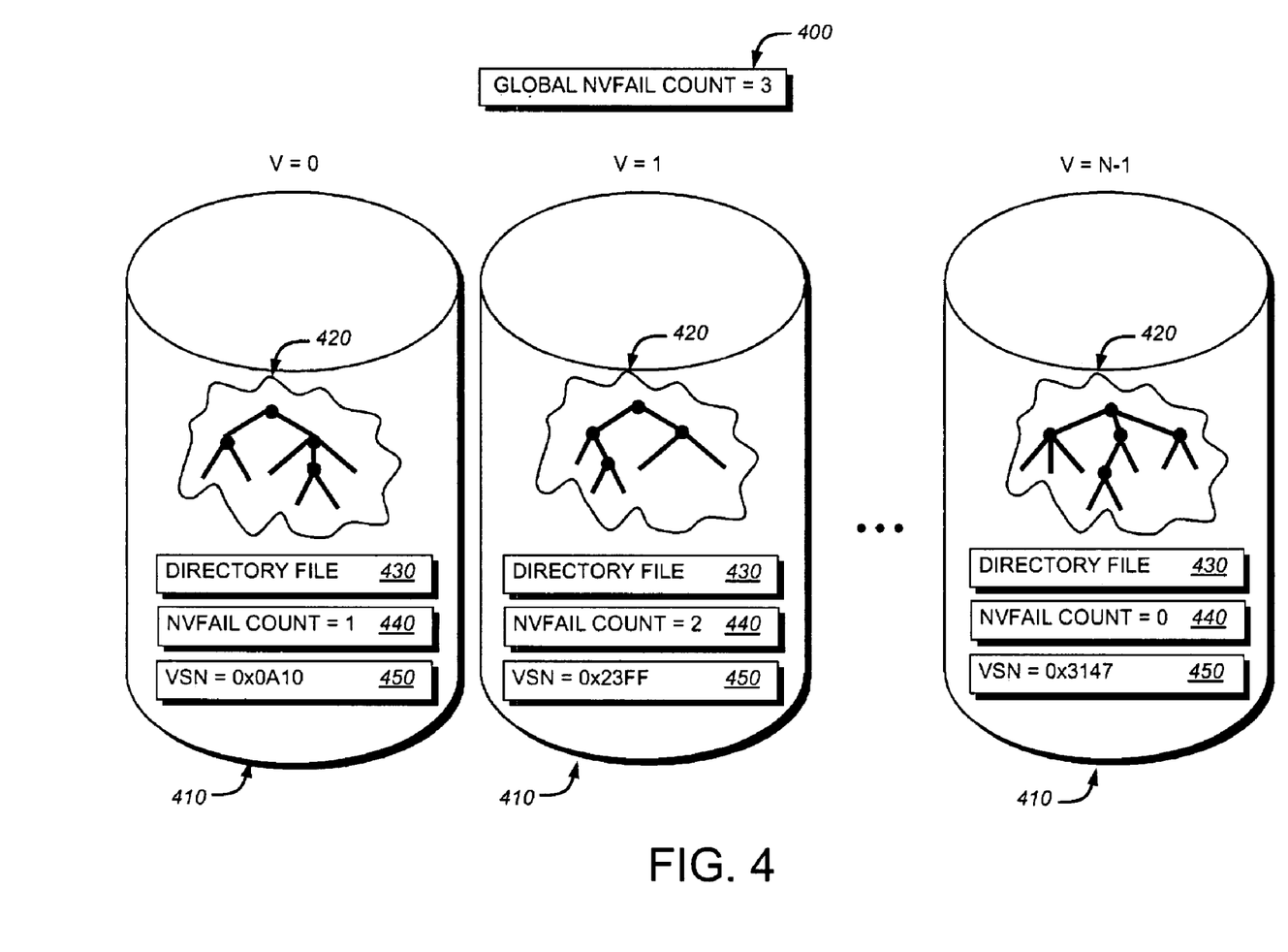
FIG. 4 is a schematic block diagram of N exemplary storage volumes and their associated nvfail information.

As noted, information stored in a filer's storage disks may be logically organized in one or more storage volumes. In an illustrative embodiment, each volume contains a set of files and directories organized in a hierarchical structure managed by a file system. For instance, FIG. 4 illustrates a set of N volumes 410 that may be implemented in the exemplary filer 200. Each volume is associated with a corresponding unique volume number (V), e.g., from 0 to N−1. Each volume 410 is also associated with a file system 420 that manages access to the volume's set of files and directories. For example, a volume may implement an inode-based file system, such as the WAFL™ file system, that manages access to a set of files and directories that are described by a hierarchical arrangement of inodes. Those skilled in the art will appreciate that other file system implementations also may be employed in a volume 410 without loss of generality.

Illustratively, each volume stores at least one "directory file" 430 that contains persistent state information associated with files or directories contained in the volume. The topmost or "root" directory is associated with a directory file 430, and additional directories and sub-directories in the volume also may be associated with corresponding directory files. The state information stored in a directory file 430 may include, inter alia, logical names, file identifiers and generation numbers associated with files or directories in the volume. For example, if a volume stores a file abc, then a directory file 430 in the volume may contain an entry that associates the file name abc with a corresponding file identifier and generation number within the volume.

Each volume 410 stores a respective nvfail count value 440 indicative of the number of times the volume was "in use" when the filer's NVRAM failed. In the illustrative embodiment, each volume's nvfail count value is cumulative and persistent for the "life" of the volume. A volume's nvfail count value is initially set equal to zero when the volume is created and is incremented by one every time there is an NVRAM failure while the volume is in use. Illustratively, each volume 410 stores its respective nvfail count value "on-disk." However, the filer's file system 350 may maintain, e.g., in in-core memory 240, a separate global nvfail count 400 that stores the sum of the individual nvfail count values corresponding to each volume loaded in the filer. Preferably, the global nvfail count is accessible to all file-management code (e.g., file system 350) in the storage operating system 300 and provides a quick check as to whether the filer has loaded any volumes having a non-zero nvfail count value. Conversely, if the global nvfail count equals zero, then it may be concluded that all the filer's loaded volumes have individual nvfail count values equal to zero. In operation, the file system 350 may update the global nvfail count every time a volume is loaded or removed from the filer's memory.

For example, assuming the filer loads all N storage volumes in FIG. 4, the global nvfail count equals the sum of the nvfail count values corresponding to the N loaded volumes. As shown, volumes V=0 and V=1 have nvfail count values equal to 1 and 2, respectively, and all other volumes have an nvfail count value equal to zero. Accordingly, in this example, the global nvfail count 400 equals 3.

To ensure data integrity in a filer's storage volumes 410, the filer may cooperate with other "cluster" file servers that mirror the filer's file-service operations. That is, the results of processing a client request at the filer are communicated and logged in a corresponding cluster file server. In this way, the filer can "fail over" to one of its clustered servers in the event that its operations are interrupted, e.g., by a reboot procedure or other such disabling event. Accordingly, each volume 410 in the disabled filer may be "taken over" by a backup cluster server (not shown). Similarly, when the filer returns to service, the cluster server may "give back" the volume to the filer. Cluster servers and failover techniques are generally described in commonly assigned application U.S. Ser. No. 09/933,866, entitled *Operator Initiated Graceful Takeover in a Node Cluster*, by Samuel M. Cramer et al. which is expressly incorporated herein by reference.

Because a volume 410 and its associated cluster volume may share the same volume number (V), each volume may be allocated a unique volume serial number (VSN) 440 that may be used to differentiate it from its cluster volume. To that end, the volume's VSN may include information specific to the filer in which the volume is implemented. For instance, the VSN may include, among other things, the filer's serial number, NVRAM version, network interface card (NIC) serial number, etc. As shown in FIG. 4, each exemplary VSN 450 is represented as a 16 bit value written in hexadecimal notation. However, it is expressly contemplated that different VSN values and formats may be employed in accordance with the teachings herein.

Figure 5:
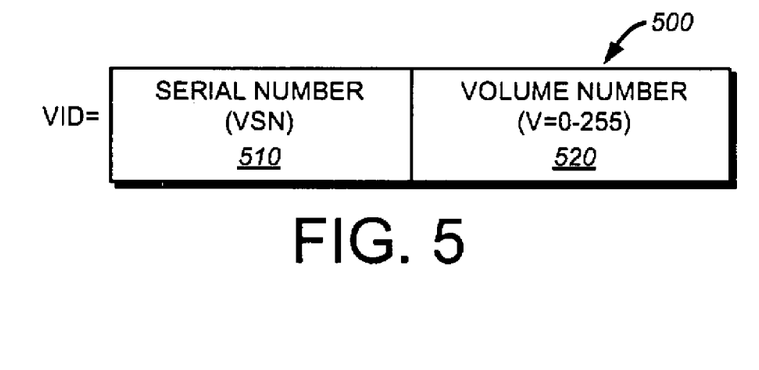
FIG. 5 is a schematic block diagram of an exemplary volume identifier (VID) that may be used to identify a storage volume.

In the illustrative embodiment, a volume's VSN may be combined with its volume number V to generate a unique volume identifier (VID) that uniquely identifies the volume in a clustered environment. The VID may be used as the volume identifier in file handles that reference files and directories stored in one or more clustered volumes. FIG. 5 illustrates a VID 500 generated by prepending a volume's VSN 510 to its volume number 520. By way of example, the volume number 520 shown is 8 bits (0–255), thereby indicating a maximum of 256 volumes may be referenced in the filer. However, it should be readily apparent to those skilled in the art that other VID implementations may comprise different volume number lengths and formats.

Figure 6:
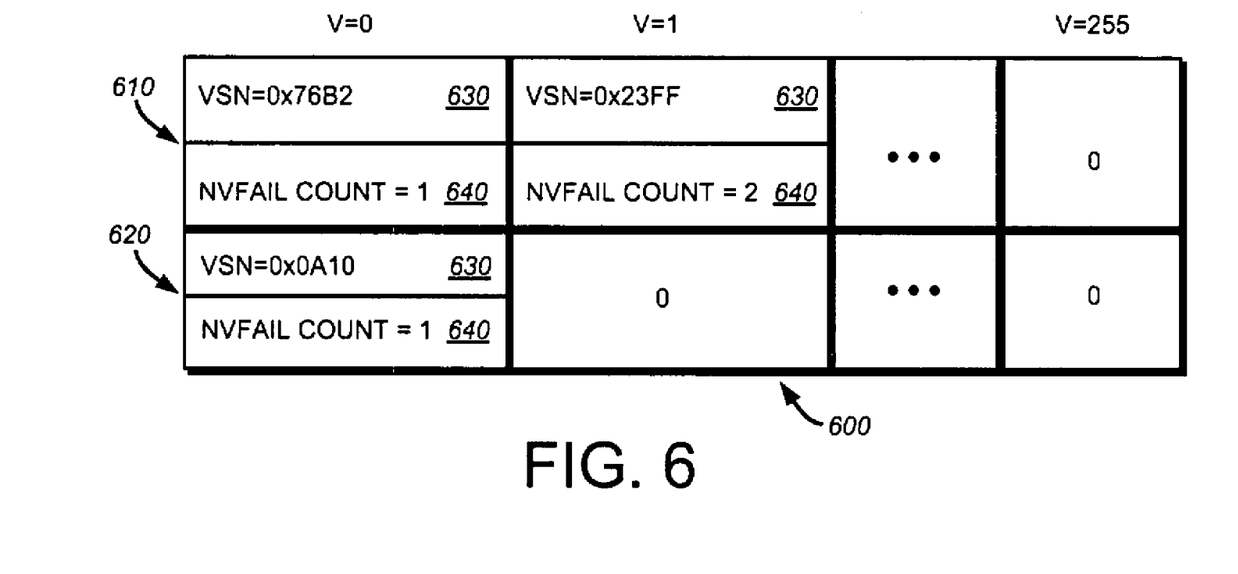
FIG. 6 is a schematic block diagram of an exemplary nvfail table which stores nvfail count values for all possible pairs of clustered volumes that may be accessed through the filer in FIG. 2.

FIG. 6 is a schematic block diagram of an "nvfail table" 600 that may be configured to store the nvfail count values of each volume loaded in the filer 200. Preferably, the table is not generated until the filer loads a volume having a non-zero nvfail count value. The nvfail table is stored in the filer's memory 240 so it may be accessed by all file management code in the storage operating system 300. More specifically, the filer's file system layer 350 may manage and update the table 600 as volumes are loaded and removed from the filer's memory. Like the global nvfail count 400, the nvfail table 600 is read-accessible to all threads and processes executing in the filer. In addition, the table 600 may be write-protected, e.g., by an appropriate locking mechanism, to ensure that its contents may only be modified by one process or thread at a time.

The exemplary table 600 comprises 256 columns, each corresponding to a different volume number that may be loaded in the filer 200. More generally, the number of columns equals the maximum number of volumes that may be loaded in the filer. For each column, the table includes two entries 610 and 620 corresponding to two possible clustered volumes having the same volume number. Notably, in embodiments where K clustered volumes can share the same volume number, each column in table 600 stores K entries. The table entries 610 and 620 are configured to store nvfail count values associated with the filer's loaded volumes and their associated clustered volumes. Specifically, an entry equals zero unless it corresponds to a volume having a non-zero nvfail count value. On the other hand, non-zero entries in the table 600 store a volume's VSN 630 and its corresponding non-zero nvfail count value 640. Preferably, when only one volume in a pair of clustered volumes has a non-zero nvfail count value, it is stored in the "top" entry 610. In this manner, if a volume's entry 610 is equal to zero, then it may be concluded that its corresponding entry 620 also equals zero.

Operationally, the nvfail table 600 provides a quick and easy way to retrieve nvfail count values associated with the filer's loaded volumes. For example, the filer may receive an external file handle, e.g., in a client request, that corresponds to a particular file or directory stored in the filer. Specifically, the received external file handle may contain a volume identifier VID that identifies in which volume the requested file or directory is stored. According to the illustrative embodiment, an appropriate file-access layer of the protocol stack in the filer may extract a volume number V from the VID in the received external file handle, and the extracted volume number is used as a direct index into the table 600. Alternatively, the nvfail table 600 may be organized differently, e.g., as a hash table. Thus, more generally, the received VID may be used to index an entry in the table 600 in a manner appropriate to the table's organization.

Upon indexing (i.e., locating) a column in the table 600 associated with a volume number equal to the volume number V extracted from the received VID, the contents of the indexed column's "top" entry 610 is read. If the entry 610 equals zero, then the file-access layer or "protocol engine" determines that the volume's nvfail count value equals zero. On the other hand, if the indexed entry 610 is non-zero, then the VSN 630 stored in the entry 610 is compared with that contained in the received VID. If the VSN in the entry 610 matches the VSN contained in the received VID, then the entry 610's nvfail count value 640 is retrieved by the file-access protocol engine. Otherwise, the file-access protocol engine locates the contents of the indexed column's "bottom" entry 620. If the entry 620 equals zero, then an nvfail count value equal to zero is retrieved for the requested VID. However, if the entry 620 does not equal zero, then its contained nvfail count value 640 is retrieved by the file-access protocol engine.

D. Generating External File Handles

According to one aspect of the inventive technique, the file system 350 associates a unique internal file handle with each file or directory stored in the filer. In this way, the in-core file handle of a file or directory served by the file system is the same as its on-disk file handle representation (i.e., the "unique" internal file handle). This unique internal file handle may be used by a file-access protocol engine, such as the NFS protocol engine 344, to generate a corresponding external file handle.

In the illustrative embodiment, the external file handle is generated by modifying the unique internal file handle with NVRAM-failure ("nvfail") information. Modification of the unique internal file handle is effected by adjusting its generation number based on the value of an "nvfail count value" associated with the volume in which the file or directory is stored. Preferably, the generation number is incremented by the volume's nvfail count value. Notably, this adjustment is made "outside" the file system 350 and is essentially "off-loaded" onto a file-access protocol engine, such as the NFS protocol engine 344. In this manner, the file system 350 does not have to adjust generation numbers when files and directories are transferred between the filer's disk storage 140 and memory 240.

In a preferred embodiment, only file-access protocol engines configured in accordance with stateless protocols, such as the NFS protocol, generate external file handles by modifying unique internal file handles in the filer. Since stateful file-access protocol engines typically implement their own file-handle invalidation schemes, external file handles generated by the stateful protocol engines generally do not need to incorporate nvfail information, e.g., to account for which external file handles become stale as a result of an NVRAM failure. Accordingly, external file handles generated by stateful file-access protocol engines therefore may be the same as their corresponding unique internal file-handle representations.

In operation, a client typically sends the filer a "file-handle lookup" request in order to receive an external file handle corresponding to a file or directory stored in the filer. Accordingly, the request may include, inter alia, a file name (or path) that identifies the client-requested file or directory and a volume identifier VID that identifies the volume in which the file or directory is stored. The request is received at a network interface of the filer and is stripped of its network headers (e.g., TCP/IP headers) by the network layers 310–330 of the filer's protocol stack. The request is then transferred to an appropriate file-access protocol engine, such as the NFS protocol engine 344, in the filer's storage operating system 300.

The file-access protocol engine parses the VID from the request and matches the parsed VID to a volume identifier previously loaded in the filer's memory 240. In this way, the protocol engine locates the filer volume containing the client-requested file or directory. When a volume is loaded in the filer, e.g., by the file system 350, not only is its VID copied into the filer's memory, but the volume's one or more directory files 430 are also loaded in the memory. Thus, the protocol engine can locate the requested file or directory's file identifier and generation number by indexing into an appropriate one of the volume's directory files 430. For instance, a file name or path included in the request may be used as an index to a directory file. The file-access protocol engine then aggregates the VID, file identifier and generation number to derive the file or directory's unique internal file handle representation. It is noted that before the protocol engine formulates the internal file handle as described, it may have to determine that the client has the requisite file-access permissions and is properly mounted on the volume containing the file or directory.

Once the file-access protocol engine has identified the unique internal file handle, it creates the requested external file handle by adjusting the internal file handle's generation number based on an nvfail count value. Notably, this adjustment is preferably only performed when the file-access protocol engine is configured in accordance with a stateless file-system protocol. Specifically, the protocol engine locates an nvfail count value, e.g., from an nvfail table 600, associated with the volume containing the client-requested file or directory. The retrieved nvfail count value is added to the internal file handle's generation number, thereby resulting in the requested external file handle. The generated external file handle is then passed from the file-access protocol engine to the network protocol layers and returned to the requesting client. Thereafter, the client may use the external file handle to reference the file or directory in future file-access requests.

By way of example, suppose a file xyz has an internal file handle equal to [VID:V=4][F=7][G=6] and the nvfail count of the file's containing volume equals one. Here, the notation VID:V=4 indicates that the file handle's volume identifier VID includes a volume number V equal to 4. In this case, a file-access protocol engine in the filer 200 generates an external file handle for the file xyz by incrementing the internal file handle generation number (G=6) by the volume's nvfail count value (1). The resultant external file handle therefore equals [VID:V=4][F=7][G=7]. Consequently, the generated external file handle may be issued to clients that desire to access the file xyz.

An external file handle may become invalid ("stale") if the filer's NVRAM subsequently fails sometime after the file handle was generated. For instance, assume the filer's NVRAM fails while the volume containing file xyz is in use, so the volume's nvfail count is incremented to equal two (assuming it previously equaled one). According to the illustrative embodiment, the file xyz is then associated with a new external file handle equal to [VID:V=4][F=7][G=8], and its previous external file handle [VID:V=4][F=7][G=7] is no longer valid. Accordingly, the file-access protocol engine that receives a stale external file handle may be configured to notify the requesting client that it needs to, e.g., remount the volume affected by the NVRAM failure, and receive new external file handles for the requested volume.

E. Validating External File Handles

According to another aspect of the invention, the file-access protocol engine may be configured to determine whether a received external file handle is invalid ("stale") as a result of an NVRAM failure that occurred since the external file handle was generated. As noted, in the illustrative embodiment, an external file handle differs from its corresponding internal file handle only by the value of its generation number. Therefore, the file-access protocol engine may adjust the external file handle's generation number and compare it to an "expected" generation number in the corresponding internal file handle. If the adjusted generation number equals the expected generation number, then the protocol engine determines that the external file handle is valid. Otherwise, it determines that the external file handle is stale.

Figure 7:
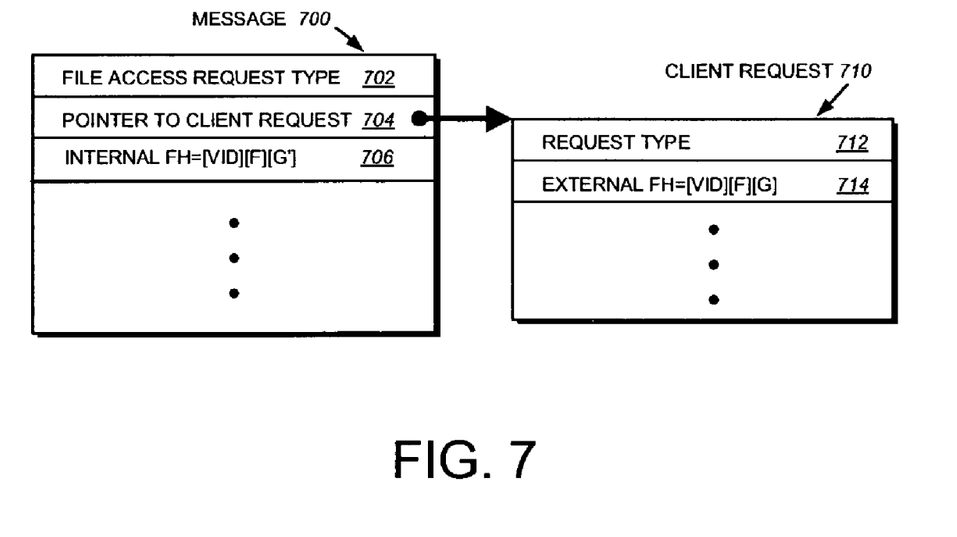
FIG. 7 is a schematic block diagram of a file system message that may be communicated within the layers of FIG. 3's storage operating system.

FIG. 7 illustrates a schematic block diagram of a message 700 that may be generated by a file-access protocol engine in response to receiving a client request 710. Here, it is assumed that the network layers have been stripped from the client request, e.g., by the network layers 310–330, and the request has been transferred to a file-access protocol engine, such as the NFS engine 344. Typically, the request 710 is stored in one or more memory buffers ("mbufs") in the filer's memory 240, and the request contains, inter alia, a request type 712 and an external file handle 714. The request type 712 indicates whether the client requests to OPEN, WRITE, RENAME, etc. a file or directory stored in the filer. The external file handle 714 specifies to which file or directory the client request is directed.

In response to receiving the client request, the file-access protocol engine generates the message 700 which is passed to the file-system layer 350 for processing. The message 700 may include, among other things, an identifier 702 indicating the type of access sought of the file system, a pointer 704 that references the client request 710, and an internal file handle 706 corresponding to the client's requested file or directory. Before the file system 350 processes the message 700, the generation numbers contained in the requested file's (or directory's) internal and external file handles 706 and 714 are compared to determine whether the external file handle is valid. In an illustrative embodiment, the file-access protocol engine performs this validation before the message 700 is passed to the file system. Alternatively, the message 700 may be passed to the file system which tests the validity of the external file handle 714.

In either case, a volume number V and a volume serial number VSN are extracted from the VID contained in the external file handle 714. The extracted volume number V is then used as an index into an nvfail table 600, and an nvfail count value of the volume containing the external file handle's requested file or directory is identified, e.g., in the manner previously described in regards to FIG. 6. The validity of the external file handle 714 is then tested by subtracting the volume's nvfail count value from the generation number included in the external file handle and comparing the resultant generation number with the generation number contained in the internal file handle 706. If the two generation numbers are equal, then the external file handle is valid and the message 700 may be processed as normal. On the other hand, if the generation numbers are not equal, then the external file handle 714 is determined to be stale. In such a case, the message 700 is not processed, and the client may be notified that its external file handle 714 is no longer valid.

For example, assume the external file handle 714 equals [VID:V=4][F=7][G=7], and its corresponding internal file handle 706 equals [VID:V=4][F=7][G=6]. Further assume that the requested volume, having a volume number V equal to 4, has an nvfail count value equal to 2. Notably, the volume's nvfail count value may be identified from an nvfail table 600. The validity of the external file handle is determined by subtracting the volume's nvfail count value (2) from the external file handle's generation number (G=7), and comparing the resultant generation number (G=5) with the generation number of the internal file handle (G=6). Because the generation numbers are unequal (5≠6), the external file handle is determined to be invalid.

According to the illustrative embodiment, the file-access protocol engine performs a file-handle validation procedure to determine whether the received external file handle 714 is stale. The procedure comprises one or more "validity tests" that are performed before the external file handle is compared with its corresponding internal file handle. Based on the results of these tests, the protocol engine may not need to perform the above-noted generation number calculation and comparison to determine whether the received external file handle 714 is valid. Instead, one or more of the validity tests are first performed, and if the result of any of the tests is positive, the file-access protocol engine may quickly identify that the external file handle is valid. Therefore, by performing the validity tests, the file-handle validation procedure may obviate the more time-consuming and processing-intensive generation number comparison.

For example, one validity test checks whether the file handle is formatted according to a stateful or stateless file-system protocol. Because statefll protocols, such as the CIFS protocol, typically implement their own file-handle invalidation schemes, the file-access protocol engine determines that the received external file handle 714 is valid if it is formatted according to a statefll protocol.

Another validity test determines whether the filer's global nvfail count 400 equals zero, i.e., all the filer's loaded volumes have nvfail count values equal to zero. When the global nvfail count equals zero, the file-access protocol engine concludes that the requested volume's nvfail count value also must equal zero. Consequently, the protocol engine further concludes that the external file handle 714 references a file or directory stored in a volume that has never been "in use" during an NVRAM failure. Accordingly, the external file handle 714 cannot be stale as a result of an NVRAM failure, and therefore it is determined to be valid.

Yet another test performed by the file-access protocol engine determines the validity of an external file handle 714 based on the nvfail count value associated with the individual volume containing the file handle's referenced file or directory. For instance, the protocol engine may index a column in an nvfail table 600, e.g., stored at a predetermined memory location in the filer, to identify the nvfail count value associated with the volume containing the file or directory referenced by the external file handle. As explained above, the protocol engine concludes that the external file handle 714 is valid if the volume's nvfail count equals zero.

Figure 8:
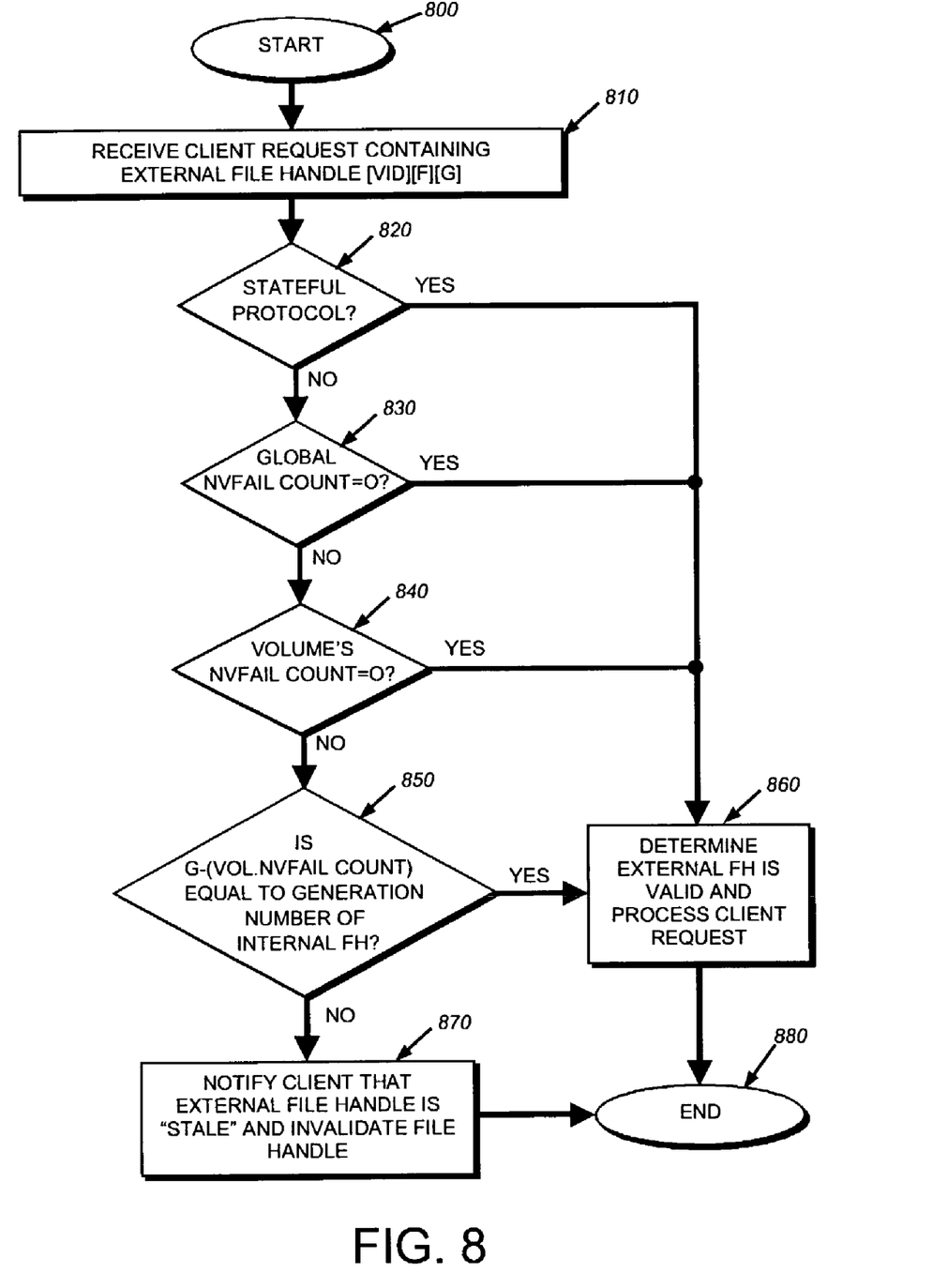
FIG. 8 is a flowchart illustrating a sequence of steps for determining the validity of an external file handle received at the filer in FIG. 2.

FIG. 8 illustrates a sequence of steps for determining the validity of an external file handle, e.g., received in a client request. The sequence starts at step 800 and proceeds to step 810 where a client request containing an external file handle is received at a filer 200. The file handle, in the illustrative embodiment, contains at least a volume identifier (VID), a file identifier (F) and a generation number (G). The request is passed to the network protocol layers of the filer's storage operating system 300 where it is stripped of its network protocol headers. The request is then forwarded to a file-access protocol engine, such as the NFS engine 344, in the storage operating system. At step 820, the protocol engine determines whether the client request is formatted according to a stateful or stateless protocol. If the request is formatted in accordance with a stateful protocol, then, at step 860, the file-access protocol engine determines that the received external file handle is valid and the client request is processed as normal.

On the other hand, if the request is formatted according to a stateless protocol, such as the NFS protocol, the protocol engine reads the value of a global nvfail count 400, e.g., accessible through the filer's file system layer 350. At step 830, the file-access protocol engine determines whether the global nvfail count equals zero. If it does equal zero, then the sequence proceeds to step 860 where the received external file handle is determined to be valid and the client request is processed as normal.

However, if the global nvfail count is greater than zero, the file-access protocol engine next tests whether the received external file handle's volume identifier VID corresponds to a volume having an nvfail count value equal to zero. For example, the protocol engine may index into an nvfail table 600 using a volume number V included in the external file handle's VID, e.g., as described in regards to FIG. 6. If the result of the table look-up indicates that the requested volume's nvfail count value equals zero, at step 840, then the sequence proceeds to step 860 where the external file handle is determined to be valid and the client request is processed as normal.

At step 850, the file-access protocol engine, having retrieved the requested volume's nvfail count value from the nvfail table 600 at step 840, subtracts the retrieved nvfail count value from the generation number contained in the received external file handle. If the result equals the generation number of the requested file's (or directory's) internal file handle, then the external file handle is determined to be valid. In this case, at step 860, the client request is then processed as normal.

However, if the generation numbers compared at step 850 are not equal, then at step 870, the file-access protocol engine generates a response that is forwarded to the requesting client notifying the client that its external file handle is stale. In addition, at step 870, the external file handle is also invalidated, e.g., by the file-access layer. That is, the external file handle is no longer recognized within the filer's storage operating system as a valid external file handle. The sequence ends at step 880.

F. Conclusion

Advantageously, the inventive technique enables a filer to generate an external file handle using only a single internal file handle associated with each file or directory stored in the filer. In this manner, the technique reduces the amount of coding overhead and filer processing previously required to implement on-disk and in-core internal file handles. Furthermore, external file handles generated by the technique are "backwards compatible" with previous implementations. As such, upgrade or revert of a filer's version may be performed transparently to its clients. In addition, the technique minimizes the amount of time and processing the filer consumes when determining the validity of external file handles. As such, the filer can perform its file-handle invalidation operations in a faster, more efficient manner than in prior implementations.

The foregoing has been a detailed description of an illustrative embodiment of the invention. Various modifications and additions can be made without departing from the spirit and scope of the invention. For example, although a file-access protocol engine in the illustrative embodiment generates external file handles in the filer 200, the external file handles alternatively may be generated by code in the file system 350. Similarly, while external file handles are validated by a file-access protocol engine, e.g., according to the sequence of steps in FIG. 8, it is also expressly contemplated that the validity tests described herein may alternatively be performed by code in the file system layer. In addition, those skilled in the art will appreciate that each of the "validity tests" described herein may be implemented singly or in combination with one or more other validity tests. The inventive technique is not limited to any particular file-access protocol format and the teachings set forth herein may be applied to external file handles formatted according to various stateless and stateful protocols.

Furthermore, while this description has been written in reference to filers and file servers, the principles are equally pertinent to all types of computers, including those configured for block-based storage systems (such as storage area networks), file-based storage systems (such as network attached storage systems), combinations of both types of storage systems (such as multi-protocol storage appliances), and other forms of computer systems. It is also expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for efficiently generating and validating external file handles at a storage operating system of a storage system, the method comprising:

associating a unique internal file handle with each file or directory stored on the storage system, the unique internal file handle used by the storage operating system when transferring the unique internal file handle's associated file or directory between a disk and memory of the storage system;

generating an external file handle for the file or directory at the storage operating system, wherein the external file handle for the file or directory is generated by adjusting the value of a generation number contained in the unique internal file handle using NVRAM-failure information; and in response to receiving the external file handle at the storage system, determining whether the external file handle is valid based on the result of one or more validity tests performed by the storage operating system.

2. A method for efficiently generating and validating external file handles at a storage operating system of a storage system, the method comprising:

associating a unique internal file handle with each file or directory stored on the storage system, the unique internal file handle used by the storage operating system when transferring the unique internal file handle's associated file or directory between a disk and memory of the storage system;

generating an external file handle for the file or directory at the storage operating system; and in response to receiving the external file handle at the storage system, determining whether the external file handle is valid based on the result of one or more validity tests performed by the storage operating system, wherein the one or more validity tests determine that the external file handle is valid if at least one of the following criteria is satisfied:

(a) the external file handle is formatted according to a stateful protocol;

(b) no storage volumes loaded by the storage operating system were in use when an NVRAM memory in the storage system failed; and (c) a storage volume containing the file or directory was not in use when an NVRAM memory in the storage system failed.

3. The method according to claim 2, wherein a file-access protocol engine implemented in the storage operating system performs the one or more validity tests.

4. The method according to claim 2, wherein a global nvfail count in the storage operating system indicates whether any storage volumes loaded in the storage system were in use when an NVRAM memory in the storage system failed.

5. A method for efficiently generating external file handles at a storage operating system of a storage system having an NVRAM memory, the method comprising:

associating a unique internal file handle with each file or directory stored on the storage system, the unique internal file handle used by the storage operating system when transferring the unique internal file handle's associated file or directory between a disk and memory of the storage system; and generating an external file handle for the file or directory at the storage operating system by combining NVRAM-failure ("nvfail") information with the unique internal file handle.

6. The method according to claim 5, wherein the nvfail information indicates the number of times a storage volume containing the file or directory was in use when the NVRAM memory failed.

7. The method according to claim 6, wherein the external file handle is generated by adding the nvfail information to a generation number included in the unique internal file handle.

8. The method according to claim 5, further comprising:
associating a volume number with each storage volume implemented in the storage operating system;
generating an nvfail table having entries which are indexed by the volume numbers; and
storing the nvfail information in the nvfail table when a storage volume containing the unique file handle's associated file or directory is loaded in the storage system.

9. The method according to claim 8, wherein the nvfail table stores nvfail information related to one or more cluster volumes.

10. The method according to claim 8, wherein the nvfail table is organized as a hash table.

11. A method for efficiently validating external file handles at a storage operating system of a storage system having an NVRAM memory, the method comprising:
receiving an external file handle at the storage system; and
determining that the external file handle is valid if at least one of the following criteria is satisfied:
(a) the external file handle is formatted according to a stateful protocol;
(b) a global nvfail count equals zero, the global nvfail count indicating the total number of times storage volumes loaded in the storage system were in use when the NVRAM memory failed; and
(c) an nvfail count value equals zero, the nvfail count value indicating the number of times a storage volume containing a file or directory referenced by the external file handle was in use when the NVRAM memory failed; and
if none of the criteria (a)–(c) is satisfied, then determining whether the external file handle is valid by comparing the external file handle to a unique internal file handle in the storage operating system.

12. The method according to claim 11, wherein the nvfail count value is retrieved from an nvfail table.

13. The method according to claim 11, wherein the step of comparing the external file handle to a corresponding internal file handle further comprises:
adjusting the value of a generation number in the external file handle based on the nvfail count value;
comparing the adjusted value of the external file handle's generation number to a generation number contained in the unique internal file handle; and
determining the external file handle is valid if the adjusted value of the external file handle's generation number is equal to the generation number contained in the unique internal file handle.

14. A method for efficiently generating and validating external file handles at a storage operating system of a storage system, the method comprising:
associating a unique internal file handle with each file or directory stored on the storage system, the unique internal file handle used by the storage operating system when transferring the unique internal file handle's associated file or directory between a disk and memory of the storage system;
generating an external file handle for the file or directory at the storage operating system;
in response to receiving the external file handle at the storage system, determining whether the external file handle is valid based on the result of one or more validity tests performed by the storage operating system; and
determining that the external file handle is valid if the external file handle is formatted according to a stateful protocol.

15. A method for efficiently generating and validating external file handles at a storage operating system of a storage system, the method comprising:
associating a unique internal file handle with each file or directory stored on the storage system, the unique internal file handle used by the storage operating system when transferring the unique internal file handle's associated file or directory between a disk and memory of the storage system;
generating an external file handle for the file or directory at the storage operating system;
in response to receiving the external file handle at the storage system, determining whether the external file handle is valid based on the result of one or more validity tests performed by the storage operating system; and
determining that the external file handle is valid if no storage volumes loaded by the storage operating system were in use when a non-volatile memory in the storage system failed.

16. A method for efficiently generating and validating external file handles at a storage operating system of a storage system, the method comprising:
associating a unique internal file handle with each file or directory stored on the storage system, the unique internal file handle used by the storage operating system when transferring the unique internal file handle's associated file or directory between a disk and memory of the storage system;
generating an external file handle for the file or directory at the storage operating system;
in response to receiving the external file handle at the storage system, determining whether the external file handle is valid based on the result of one or more validity tests performed by the storage operating system; and
determining that the external file handle is valid if a storage volume containing the file or directory was not in use when a non-volatile memory in the storage system failed.

17. A method for efficiently generating and validating external file handles at a storage operating system of a storage system, the method comprising:
associating a unique internal file handle with each file or directory stored on the storage system, the unique internal file handle used by the storage operating system when transferring the unique internal file handle's associated file or directory between a disk and memory of the storage system;
generating an external file handle for the file or directory at the storage operating system using a file-access protocol engine;
adjusting the value of a generation number contained in the unique internal file handle using non-volatile memory failure information; and
in response to receiving the external file handle at the storage system, determining whether the external file handle is valid based on the result of one or more validity tests performed by the storage operating system.

18. A method for using an external file handle at a storage system, the method comprising:
- maintaining a backup copy of client requests in a non-volatile memory in the storage system;
- calculating, in response to a client-access request, an internal generation number for the requested file or directory;
- calculating a non-volatile memory failure (nvfail) count indicating a number of failures of the non-volatile memory;
- calculating, in response to the internal generation number and the nvfail count, an external generation number; and
- calculating, in response to the external generation number, a current external file handle.

19. The method of claim 18, further comprising:
- receiving at the storage system a client request containing an external file handle;
- comparing the received external file handle with the current external file handle; and
- determining, in response to comparing the received external file handle with the current external file handle, whether the received external file handle is valid.

20. A computer system, comprising:
- a non-volatile memory;
- means for associating a unique internal file handle with a file or directory stored by the computer system, the unique internal file handle used for transferring the file or directory between a disk and memory in the computer system; and
- means for generating an external file handle for the file or directory by combining non-volatile memory failure ("nvfail") information with the unique internal file handle.

21. The computer system according to claim 20, further comprising:
- means for using the nvfail information to indicate the number of times a storage volume containing the file or directory was in use when the NVRAM memory failed.

22. The computer system according to claim 21, further comprising:
- means for generating the external file handle by adding the nvfail information to a generation number included in the unique internal file handle.

23. The computer system according to claim 20, further comprising:
- means for associating a volume number with each storage volume implemented in the storage operating system;
- means for generating an nvfail table having entries which are indexed by the volume numbers; and
- means for storing the nvfail information in the nvfail table when a storage volume containing the unique file handle's associated file or directory is loaded in the storage system.

24. The computer system according to claim 23, further comprising:
- means for using the nvfail table to store nvfail information related to one or more cluster volumes.

25. The computer system according to claim 23, further comprising:
- means for organizing the nvfail table as a hash table.

26. A method for efficiently validating external file handles at a storage system having a non-volatile memory, the method comprising:
- receiving an external file handle at the storage system; and
- determining that the external file handle is valid based on a number of times that the non-volatile memory has failed.

27. The method of claim 26, further comprising:
- determining that the external file handle is valid if a global non-volatile memory failure ("nvfail") count equals zero, the global nvfail count indicating the total number of times storage volumes loaded in the storage system were in use when the non-volatile memory failed.

28. The method of claim 26, further comprising:
- determining that the external file handle is valid if a non-volatile memory failure ("nvfail") count value equals zero, the nvfail count value indicating the number of times a storage volume containing a file or directory referenced by the external file handle was in use when the non-volatile memory failed.

29. A system for efficiently generating external file handles, comprising:
- a memory configured to store instructions for execution by a processor, at least a portion of the instructions embodying a storage operating system configured to perform the steps of:
- associating a unique internal file handle with each file or directory stored on a storage system, the unique internal file handle used by the storage operating system when transferring the unique internal file handle's associated file or directory between a disk and memory of the storage system; and
- generating an external file handle for the file or directory at the storage operating system by combining NVRAM-failure ("nvfail") information with the unique internal file handle.

30. The system according to claim 29, wherein the nvfail information indicates the number of times a storage volume containing the file or directory was in use when the NVRAM memory failed.

31. The system according to claim 30, wherein the external file handle is generated by adding the nvfail information to a generation number included in the unique internal file handle.

32. The system according to claim 29, further comprising:
- the storage operating system associates a volume number with each storage volume implemented in the storage operating system, and generates an nvfail table having entries which are indexed by the volume numbers, and stores the nvfail information in the nvfail table when a storage volume containing the unique file handle's associated file or directory is loaded in the storage system.

33. The system according to claim 32, wherein the nvfail table stores nvfail information related to one or more cluster volumes.

34. The system according to claim 32, wherein the nvfail table is organized as a hash table.

35. A computer readable media, comprising:
- said computer readable media having instructions written thereon for execution on a processor for the practice of efficiently generating external file handles at a storage operating system of a storage system having an NVRAM memory comprising the steps of:
- associating a unique internal file handle with each file or directory stored on the storage system, the unique internal file handle used by the storage operating system when transferring the unique internal file handle's associated file or directory between a disk and memory of the storage system; and
- generating an external file handle for the file or directory at the storage operating system by combining NVRAM-failure ("nvfail") information with the unique internal file handle.

* * * * *